(12) United States Patent
Chae et al.

(10) Patent No.: US 9,268,149 B2
(45) Date of Patent: Feb. 23, 2016

(54) OPTICAL FILTER

(75) Inventors: Seung Hun Chae, Daejeon (KR); Kyung Ki Hong, Chungcheongbukdo (KR); Jung Hyun Yeo, Cheongju-si (KR); Yong Il Cho, Seongnam-si (KR); Moon Soo Park, Daejeon (KR); Sang Seop Kim, Chungcheongbuk-do (KR)

(73) Assignee: LG CHEM, LTD., Seoul (KR)

( * ) Notice: Subject to any disclaimer, the term of this patent is extended or adjusted under 35 U.S.C. 154(b) by 828 days.

(21) Appl. No.: 13/567,751

(22) Filed: Aug. 6, 2012

(65) Prior Publication Data

US 2015/0205143 A1 Jul. 23, 2015

(30) Foreign Application Priority Data

Aug. 5, 2011 (KR) .................. 10-2011-0077984

(51) Int. Cl.
| | |
|---|---|
| G02B 27/26 | (2006.01) |
| G02B 5/20 | (2006.01) |
| G02B 5/30 | (2006.01) |
| G02F 1/1335 | (2006.01) |
| G02F 1/1334 | (2006.01) |
| G02B 27/22 | (2006.01) |

(52) U.S. Cl.
CPC ........ *G02B 27/26* (2013.01); *G02B 5/20* (2013.01); *G02B 5/3016* (2013.01); *G02B 5/3083* (2013.01); *G02B 27/2214* (2013.01); *G02F 1/1334* (2013.01); *G02F 1/133509* (2013.01); *G02F 1/133528* (2013.01)

(58) Field of Classification Search
CPC .......... G02B 1/04; G02B 27/22; G02B 27/26; G02B 5/3016; G02B 5/3089; G02B 27/2214; G02B 5/20; G02B 5/3083; G02F 1/133509; G02F 1/133528
See application file for complete search history.

(56) References Cited

U.S. PATENT DOCUMENTS

| | | | |
|---|---|---|---|
| 5,235,445 A | 8/1993 | Hiral et al. | |
| 2006/0257589 A1 | 11/2006 | Hayashi et al. | |
| 2008/0297703 A1 | 12/2008 | Kawanishi et al. | |
| 2011/0157524 A1 | 6/2011 | Kawanishi et al. | |
| 2013/0314785 A1* | 11/2013 | Kang et al. | 359/485.01 |
| 2014/0036363 A1* | 2/2014 | Seo et al. | 359/489.07 |

FOREIGN PATENT DOCUMENTS

| | | |
|---|---|---|
| CN | 1211745 A | 3/1999 |
| CN | 101435993 A | 5/2009 |
| CN | 101546003 A | 9/2009 |
| JP | 2006-241336 A | 9/2006 |
| JP | 2006-251658 A | 9/2006 |
| JP | 2007-119717 | 5/2007 |
| JP | 2007119717 A | 5/2007 |
| JP | 2008-505195 A | 2/2008 |
| JP | 2009-210777 A | 9/2009 |
| JP | 2009-223001 A | 10/2009 |
| JP | 2010-271619 A | 12/2010 |
| JP | 2011-115969 A | 6/2011 |
| JP | 2012-517024 A | 7/2012 |
| KR | 10-2011-0070257 | 6/2011 |

(Continued)

*Primary Examiner* — Shean C Wu
(74) *Attorney, Agent, or Firm* — Dentons US LLP

(57) ABSTRACT

Provided is an optical filter and a display device. In the optical filter, patterns of first and second regions therein may be stably maintained, and therefore the optical filter capable of ensuring excellent light division characteristics for a long time may be provided.

15 Claims, 3 Drawing Sheets

(56) References Cited

FOREIGN PATENT DOCUMENTS

| | | |
|---|---|---|
| KR | 1020110070257 A | 6/2011 |
| TW | 200722801 | 6/2007 |
| TW | 201125733 A | 8/2011 |
| WO | 2010067809 A1 | 6/2010 |
| WO | 2010090429 A2 | 8/2010 |

* cited by examiner

OPTICAL FILTER

This application is a Utility Application which claims priority to and the benefit of Korean Patent Application No. 10-2011-0077984, filed on Aug. 5, 2011, which is hereby incorporated by reference in its entirety herein.

FIELD

The present application relates to an optical filter and a display device.

BACKGROUND

A technique of dividing light into at least two kinds of light having different polarized states from each other may be available in various fields.

The light division technique may be applied in manufacturing a three-dimensional (3D) image. 3D images may be realized using binocular disparity. For example, when two of two-dimensional images are respectively input to a left eye and a right eye of a human, input data is delivered to the brain and fused, and thus he/she experiences 3D perspective and reality. In such a process, the light division technique may be used.

A technique of generating a 3D image may be available in 3D measurement, a 3D TV, a camera or computer graphics.

Examples of applying the light division technique to generation of a 3D image are disclosed in Korean Patent No. 0967899 and Korean Patent Publication No. 2010-0089782.

SUMMARY

The present application may provide an optical filter and a display device.

An illustrative optical filter may include a substrate layer and a polarization control layer. The polarization control layer may be on one surface of the substrate layer. FIG. 1 shows a schematic of one illustrative embodiment of the optical filter 100, in which the polarization control layer 102 is on one surface of the substrate layer 101.

In the substrate layer, an elastic modulus in a first in-plane direction may be different from that in a second in-plane direction perpendicular to the first in-plane direction. In another embodiment, in the substrate layer, a coefficient of thermal expansion (CTE) in a first in-plane direction may be different from that in the second in-plane direction perpendicular to the first in-plane direction. In addition, in the substrate layer, both of the elastic modulus and the CTE in a first in-plane direction may be different from those in a second in-plane direction perpendicular to the first in-plane direction. The term "elastic modulus in a first or second in-plane direction" as used may refer to a storage modulus or tensile modulus, and generally a tensile modulus. The elastic modulus in the first or second in-plane direction may be measured by a method suggested in the following Example.

Here, the first in-plane direction is a direction randomly selected on the plane of the substrate layer, and the second in-plane direction is a direction perpendicular to the first in-plane direction. For example, when the substrate layer is formed in a tetragonal shape such as a square or rectangular shape, the first in-plane direction may be a horizontal direction and the second in-plane direction may be a vertical direction, or the first in-plane direction may be a vertical direction and the second in-plane direction may be a horizontal direction. In addition, the first in-plane direction may be one of a so-called machine direction (MD) and a so-called transverse direction (TD) in a plastic substrate layer, and the second in-plane direction may be the other of the MD and the TD in the plastic substrate layer. For example, in an operation of manufacturing the plastic substrate layer, the substrate layer is possibly manufactured so as to have different elastic moduli and/or CTEs in first and second in-plane directions by, for example, controlling extension or extrusion conditions.

As described above, if the substrate layer having different physical properties such as an elastic modulus and/or CTE in the first and second in-plane directions is used, and the polarization control layer is formed in a suitable pattern on the substrate layer, an optical filter having a stably maintained physical property such as a straightness of the polarization control layer may be obtained.

The elastic modulus different in the first or second in-plane directions may be an elastic modulus at 25° C. or 60° C. For example, a substrate layer having different elastic moduli at 25° C. and 60° C. in the first and second in-plane directions may be used.

If the elastic moduli of the substrate layer are different in the first and second in-plane directions, a relatively lower elastic modulus may be approximately 1,500 to 4,000 MPa, 1,800 to 3,500 MPa or 2,000 to 3,000 MPa at 25° C. Further, a relatively higher elastic modulus may be approximately 2,000 to 4,500 MPa, 2,300 to 4,000 MPa or 2,500 to 3,500 MPa at 25° C. In addition, a ratio (MH/ML) of the higher elastic modulus (MH) at 25° C. with respect to the lower elastic modulus (ML) at 25° C. may be in a range of more than 1 and not more than 5, more than 1 and not more than 4, more than 1 and not more than 3, or more than 1 and not more than 2. Within the above range, desired physical properties may be suitably realized.

In another embodiment, when the elastic moduli of the substrate layer are different in the first and second in-plane directions, a relatively lower elastic modulus may be approximately 1,400 to 3,900 MPa, 1,700 to 3,400 MPa or 1,900 to 2,900 MPa at 60° C. Here, a relatively higher elastic modulus may be approximately 1,900 to 4,400 MPa, 2,200 to 3,900 MPa, or 2,400 to 3,400 MPa at 60° C. Further, a ratio (MH/ML) of the higher elastic modulus (MH) at 60° C. with respect to the lower elastic modulus (ML) at 60° C. may be in a range of more than 1 and not more than 5, more than 1 and not more than 4, more than 1 and not more than 3, or more than 1 and not more than 2. Within the above range, desired physical properties may be suitably realized.

If the CTEs of the substrate layer are different in the first or second in-plane direction, a relatively lower CTE may be 10 to 65 ppm/K, 15 to 60 ppm/K, or 20 to 55 ppm/K. Further, a relatively higher CTE may be 35 to 80 ppm/K, 40 to 75 ppm/K, or 45 to 65 ppm/K. Moreover, a ratio (CH/CL) of the higher CTE (CH) with respect to the lower CTE (CL) may be in a range of more than 1 and not more than 5, more than 1 and not more than 4, more than 1 and not more than 3 or more than 1 and not more than 2. Within the above range, desired physical properties may be suitably realized. The CTE is a value measured according to the method disclosed in the following Example.

In one embodiment, in the first and second in-plane directions, the elastic modulus or the CTE may be different from each other. If both of the elastic modulus and the CTE in the first in-plane direction are different respectively from those in the second in-plane direction, an elastic modulus in one in-plane direction, in which the CTE is higher than that in other in-plane direction perpendicular to the one in-plane direction, may be lower than that in the other in-plane direction.

Any kind of substrate layers having the above characteristics may be used. For example, the substrate layer may be a plastic substrate layer. As described above, when extension or extrusion conditions are controlled during manufacturing the plastic substrate layer, a substrate layer having different elastic moduli and/or CTEs in the first and second in-plane directions may be obtained. As the plastic substrate layer, a sheet or film including a cellulose resin such as triacetyl cellulose (TAC) or diacetyl cellulose (DAC); a cyclo olefin polymer (COP) such as a norbornene derivative; an acrylic resin such as poly(methyl methacrylate) (PMMA); polycarbonate (PC); polyolefin such as polyethylene (PE) or polypropylene (PP); poly(vinyl alcohol) (PVA); poly(ether sulfone) (PES); poly (etheretherketon) (PEEK); poly(etherimide) (PEI); poly(ethylenenaphthalate) (PEN); polyester such as poly(ethyleneterephthalate) (PET); polyimide (PI); polysulfone (PSF) or a fluoro resin may be used.

The substrate layer may have a lower refractive index than the polarization control layer. An illustrative refractive index of the substrate layer is approximately 1.33 to 1.53. When the substrate layer has a lower refractive index than the polarization control layer, brightness is increased, reflection is prevented, and contrast characteristics are improved.

In one embodiment, the substrate layer may include a ultraviolet (UV) blocking or absorbing agent. When the substrate layer includes a UV blocking or absorbing agent, deterioration of the liquid crystal layer due to a UV ray may be prevented. As the UV blocking or absorbing agent, an organic material such as a salicylic acid ester compound, a benzophenone compound, an oxybenzophenone compound, a benzotriazol compound, a cyanoacrylate compound or a benzoate compound or an inorganic material such as zinc oxide or nickel complex salt may be used. The content of the UV blocking or absorbing agent in the substrate layer is not particularly limited, and may be suitably selected in consideration of a desired effect. For example, in the operation of manufacturing the plastic substrate layer, the UV blocking or absorbing agent may be included at approximately 0.1 to 25 wt % based on the content of a main ingredient of the substrate layer.

The polarization control layer is formed on the substrate layer in the optical filter. The polarization control layer may have first and second regions which are capable of dividing incident light such as linearly polarized incident light into two kinds of light having different polarized states from each other. To divide the light, the first and second regions may have different phase retardation characteristics.

The case where the first and second regions have different phase retardation characteristics from each other may include the case where both of the first and second regions are regions having phase retardation, a direction of an optical axis formed in one of the two regions is identical to or different from that of an optical axis formed in the other of the two regions, and degrees of the phase retardations are also different from each other; and the case where the degrees of the phase retardations are identical to each other, and a direction of an optical axis formed in one of the two regions is different from that of an optical axis formed in the other of the two regions. In another embodiment, the case where the first and second regions have different phase retardation characteristics from each other may include the case where one of the first and second regions has the phase retardation characteristic, and the other region is an optically isotropic region that does not have the phase retardation characteristic.

The first and second regions may have stripe shapes extending in a common direction and may be adjacently and alternately disposed. FIG. 2 shows a schematic of one illustrative arrangement of the first region "A" and the second region "B" as described above. The common direction, in which the stripe-shaped first and second regions are extended, for example, direction "D" of FIG. 2, may be parallel to the first or second in-plane direction of the substrate layer. For example, in case where the elastic modulus in the first in-plane direction of the substrate layer is different from that in the second in-plane direction of the substrate layer, the common direction may be parallel to an in-plane direction of the substrate layer, in which the elastic modulus is relatively lower. In another embodiment, in case where the CTE in the first in-plane direction of the substrate layer is different from that in the second in-plane direction of the substrate layer, the common direction may be parallel to an in-plane direction of the substrate layer, in which the CTE is relatively higher. Further, in still another embodiment, in case where the elastic modulus and the CTE in the first in-plane direction are different respectively from those in the second in-plane direction and, in one direction of the first and second in-plane directions, the elastic modulus is relatively lower and the CTE is relatively higher, the common direction may be parallel to the in-plane direction of the substrate layer in which the elastic modulus is relatively lower and the CTE is relatively higher. Due to such arrangement, desired physical properties can be provided to the optical filter.

In the optical filter, signals after passing through the first and second regions respectively may be linearly polarized signals, of which polarized directions are substantially vertical to each other. For example, if the light after passing through the first region is a linearly polarized light having a certain polarized direction, the signal after passing through the second region may be a linearly polarized light having a polarized direction which is substantially vertical to the certain polarized direction of the signal after passing through the first region.

In the specification, the terms "vertical," "horizontal," "perpendicular" and "parallel" used to define angles may refer to, unless particularly defined otherwise, substantially vertical, horizontal, perpendicular and parallel. The terms may include an error or a variation, which, for example, may include an error within approximately ±15 degrees, ±10 degrees or ±5 degrees, which may be considered for each term.

In another embodiment, one of the signals after passing through the first and second regions may be a left-circularly polarized signal, and the other may be a right-circularly polarized signal. To this end, at least one of the first and second regions may be a phase retardation layer.

For example, to generate the left- and right-circularly polarized signals, both of the first and second regions may include phase retardation layers, and all of the phase retardation layers in the first and second regions may be ¼ wavelength layers. To generate circular-polarized light revolved in reverse directions, an optical axis of the ¼ wavelength layer in the first region may be differently formed from an optical axis of the ¼ wavelength layer in the second region. In one embodiment, the first region may include a ¼ wavelength layer having an optical axis in a first direction, and the second region may include a ¼ wavelength layer having an optical axis in a second direction different from the first direction. Here, an angle between the optical axes formed in the first and second directions may be 90 degrees. The term "n wavelength layer" used herein may refer to a phase retarding element capable of phase retarding incident light by "n" times of the wavelength of the light. Here, the "n" may be ½, ¼ or ¾. In addition, the term "optical axis" may refer to a slow axis or a fast axis when light is passing through a region.

In another embodiment, when one of the first and second regions includes a ¾ wavelength layer, and the other includes a ¼ wavelength layer, left- and right-circularly polarized light may be generated.

In another embodiment, one of the first and second regions may be a ½ wavelength layer, and the other may be an optically isotropic region. In this case, signals after passing through the first and second regions may be emitted from the optical filter as linearly polarized lights having polarization axes in directions substantially perpendicular to each other.

The ¼, ¾ or ½ wavelength layer forming the first and/or second region(s) may be a liquid crystal layer. For example, the first and/or second region(s) may be formed by aligning a liquid crystal compound having a phase retardation characteristic, and polymerizing the compound when necessary.

The liquid crystal layer may include a polymerizable liquid crystal compound. In one embodiment, the liquid crystal layer may include the liquid crystal compound in a polymerized form. The term "polymerizable liquid crystal compound" may refer to a compound including a part exhibiting liquid crystallinity, for example, a mesogen backbone, and also including at least one polymerizable functional group. In addition, the term "layer including a polymerizable liquid crystal compound in a polymerized form" may refer to a layer in which the polymerizable liquid crystal compounds are polymerized so as to form a backbone such as a main or side chain of a liquid crystal polymer.

The liquid crystal layer may include an un-polymerized polymerizable liquid crystal compounds, or may further include a conventional additive such as a polymerizable non-liquid crystal compound, a stabilizer, an un-polymerizable non-liquid crystal compound or an initiator.

In one embodiment, the polymerizable liquid crystal compound in the liquid crystal layer may include at least one multifunctional polymerizable liquid crystal compound and at least one monofunctional polymerizable liquid crystal compound.

The term "multifunctional polymerizable liquid crystal compound" may refer to a compound including at least two polymerizable functional groups among the liquid crystal compound. In one embodiment, the multifunctional polymerizable liquid crystal compound may include 2 to 10, 2 to 8, 2 to 6, 2 to 5, 2 to 4, 2 to 3 or 2 polymerizable functional groups. The term "monofunctional polymerizable liquid crystal compound" may refer to a compound including one polymerizable functional group among the liquid crystal compound. When the multifunctional and monofunctional polymerizable compounds are used together, phase retardation characteristics of the liquid crystal layer may be effectively controlled, and realized phase retardation characteristics, for example, an optical axis of a phase retardation layer, or a phase retardation value may be stably maintained. The term "optical axis" used herein may refer to a slow axis or a fast axis when light is passing through a region.

The liquid crystal layer may include the monofunctional polymerizable liquid crystal compound in an amount of more than 0 parts by weight and also not more than 100 parts by weight, 1 to 90 parts by weight, 1 to 80 parts by weight, 1 to 70 parts by weight, 1 to 60 parts by weight, 1 to 50 parts by weight, 1 to 30 parts by weight or 1 to 20 parts by weight, relative to 100 parts by weight of the multifunctional polymerizable liquid crystal compounds.

In the above-mentioned range, effects realized by mixing the multifunctional and monofunctional polymerizable liquid crystal compounds may be maximized, and the liquid crystal layer may have excellent adhesive properties to other layer.

Unless particularly defined otherwise, the unit "parts by weight" used herein may refer to a weight ratio.

The liquid crystal layer may satisfy the Expression 1.

$$X < 8\%$$ [Expression 1]

In Expression 1, the "X" is a percentage of the absolute value of a change in value of phase difference after the optical filter is left at 80° C. for 100 or 250 hours with respect to initial phase difference of the liquid crystal layer.

The percentage "X" may be calculated by "$100 \times (|R_0 - R_1|)/R_0$." Here, the "$R_0$" is a value of the initial phase difference of the liquid crystal layer, and the "$R_1$" is phase difference of the liquid crystal layer after the optical filter is left at 80° C. for 100 or 250 hours. The "X" may be in the range of 7% or less, 6% or less, or 5% or less. The change of the phase retardation value may be measured by the method suggested in the following Example.

In one embodiment, the multifunctional or monofunctional polymerizable liquid crystal compound may be a compound represented by Formula 1.

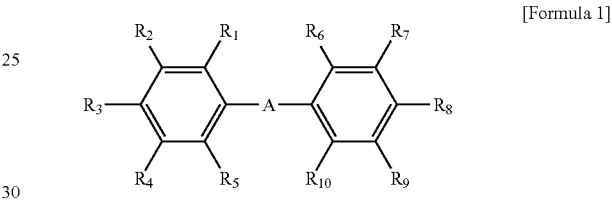

[Formula 1]

In Formula 1, A may be a single bond, —COO— or —OCO—; $R_1$ to $R_{10}$ may be each independently hydrogen, halogen, an alkyl group, an alkoxy group, an alkoxycarbonyl group, a cyano group, a nitro group, —O-Q-P or a substituent of group, a cyano group, a carboxyl group, an acryloyl group, a methacryloyl group, an acryloyloxy group, or a methacryloyloxy group.

In Formulas 1 and 2, the forming of the benzene ring substituted with —O-Q-P by connecting two adjacent substituents may mean that the two adjacent substituents are connected with each other, and thereby a naphthalene backbone substituted with —O-Q-P is formed.

In Formula 2, the mark "-" on the left of B may indicate that B is directly connected to the benzene of Formula 1.

In Formulas 1 and 2, the term "single bond" as used herein may refer to the case where there is no atom at the part represented as the "A" or "B." For example, in Formula 1, when A is a single bond, the benzenes at both sides of the "A" may be directly connected to each other, thereby forming a biphenyl structure.

In Formulas 1 and 2, the halogen may be chlorine, bromine or iodine.

The term "alkyl group" may be, unless particularly defined otherwise, a linear or branched alkyl group having 1 to 20, 1 to 16, 1 to 12, 1 to 8 or 1 to 4 carbon atoms, or a cycloalkyl group having 3 to 20, 3 to 16 or 4 to 12 carbon atoms. The alkyl group may be optionally substituted with at least one substituent.

The term "alkoxy group" may be, unless particularly defined otherwise, an alkoxy group having 1 to 20, 1 to 16, 1 to 12, 1 to 8 or 1 to 4 carbon atoms. The alkoxy group may be a linear, branched or cyclic type. In addition, the alkoxy group may be optionally substituted with at least one substituent.

The term "alkylene group" or "alkylidene group" may be, unless particularly defined otherwise, an alkylene or alkylidene group having 1 to 12, 4 to 10 or 6 to 9 carbon atoms.

The alkylene or alkylidene group may be a linear, branched or cyclic type. In addition, the alkylene or alkylidene group may be optionally substituted with at least one substituent.

In addition, the term "alkenyl group" may be, unless particularly defined otherwise, an alkenyl group having 2 to 20, 2 to 16, 2 to 12, 2 to 8, or 2 to 4 carbon atoms. The alkenyl group may be a linear, branched or cyclic type. In addition, the alkenyl group may be optionally substituted with at least one substituent.

In addition, in Formulas 1 and 2, P may be an acryloyl group, a methacryloyl group, an acryloyloxy group or a methacryloyloxy group, preferably, an acryloyloxy group or a methacryloyloxy group, and more preferably, an acryloyloxy group.

In the specification, as a substituent capable of being substituted with a specific functional group, an alkyl group, an alkoxy group, an alkenyl group, an epoxy group, an oxo group, an ocetanyl group, a thiol group, a cyano group, a carboxyl group, an acryloyl group, a methacryloyl group, an acryloyloxy group, a methacryloyloxy group or an aryl group may be used, but is not limited thereto.

The —O-Q-P which may be at least one in Formulas 1 and 2, or the residue of Formula 2 may be present at $R_3$, $R_8$ or $R_{13}$ position. In addition, the substituents which are connected to each other and thus constitute the benzene substituted with —O-Q-P, may be $R_3$ and $R_4$ or $R_{12}$ and $R_{13}$. Moreover, in the compound of Formula 1 or the residue of Formula 2, a substituent, other than —O-Q-P or the residue of Formula 2, or a substituent, other than the substituents connected to form benzene, may be hydrogen, halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group or a nitro group, and in another embodiment, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms or a cyano group.

The polymerizable liquid crystal compound may be included in the liquid crystal layer in the state of parallel alignment. In one embodiment, the compound may be included in the liquid crystal layer in a parallel-aligned polymerized state. The term "parallel alignment" used herein may mean that an optical axis of the liquid crystal layer including the liquid crystal compound has a tilt angle of approximately 0 to 25 degrees, 0 to 15 degrees, 0 to 10 degrees, 0 to 5 degrees or 0 degree with respect to the plane of the liquid crystal layer.

In one embodiment, the liquid crystal layer of the polarization control layer may have a difference in in-plane refractive index between a slow axis direction and a fast axis direction within a range of 0.05 to 0.2, 0.07 to 0.2, 0.09 to 0.2, or 0.1 to 0.2. The in-plane refractive index in the slow axis direction may refer to a refractive index in a direction exhibiting the highest refractive index on a plane of the liquid crystal layer, and the in-plane refractive index in the fast axis direction may refer to a refractive index in a direction exhibiting the lowest refractive index on a plane of the liquid crystal layer. Usually, the fast axis is perpendicular to the slow axis in the optically-anisotropic liquid crystal layer. The refractive indexes may be measured with respect to light with wavelengths of 550 and 589 nm, respectively. The difference in refractive index may be measured according to the manufacturer's manual using Axoscan produced by Axomatrix. In addition, the liquid crystal layer may have a thickness of approximately 0.5 to 2.0 μm or 0.5 to 1.5 μm. The liquid crystal layer having the relationship of the refractive indexes and the thickness may realize a phase retardation characteristic suitable for a purpose to be applied. In one embodiment, the liquid crystal layer having the relationship of the refractive indexes and the thickness may be suitable for an optical element for dividing light.

The optical filter may further include an alignment layer present between the substrate layer and the polarization control layer. For example, referring to FIG. 1, the optical filter 100 may further include an alignment layer between the substrate layer 101 and the polarization control layer 102. The alignment layer may be a layer serving to align a liquid crystal compound in an operation of forming the optical filter. As the alignment layer, a conventional alignment layer, which is known in the art, for example, an alignment layer formed in an imprinting method, an optical alignment layer or a rubbing alignment layer may be used. The alignment layer is an optional component, and in some cases, alignment capability may be provided without an alignment layer by directly rubbing or extending the substrate layer.

In another aspect, a method of manufacturing an optical filter is provided. The illustrative method of manufacturing an optical filter may include forming a polarization control layer on a substrate layer.

The method may include forming a polarization control layer including first and second regions having different phase retardation characteristics and closely and alternately disposed in a stripe shape extending in a common direction on a substrate layer in which an in-plane elastic modulus and/or CTE in a first in-plane direction is/are different from in-plane elastic modulus and/or CTE in a second in-plane direction.

In the method, when the elastic moduli of the substrate layer are different in the first and second in-plane directions, the common extending direction of the polarization control layer may be parallel to one of the first and second in-plane directions in which the substrate layer has a lower elastic modulus. In another embodiment, when the CTE of the substrate layer are different in the first and second in-plane directions, the common extending direction of the polarization control layer may be parallel to one of the first and second in-plane directions in which the substrate layer has a higher CTE. In addition, in still another embodiment, when the elastic moduli and CTE of the substrate layer are different in both of the first and second in-plane directions, and the elastic modulus is lower and the CTE is higher in one of the directions, the common extending direction of the polarization control layer may be parallel to one of the first and second in-plane directions in which the elastic modulus is lower and the CTE is higher.

The method of forming a polarization control layer described above is not particularly limited. For example, when the polarization control layer is a liquid crystal layer, the polarization control layer may be formed by forming an alignment layer on a substrate layer, forming a coating layer of a liquid crystal composition including the polymerizable liquid crystal compound on the alignment layer, and polymerizing the aligned liquid crystal composition to form a liquid crystal layer.

The alignment layer may be formed by forming a polymer film such as a polyimide film on the substrate layer and rubbing the polymer film, or coating a photo-alignment compound and executing alignment through irradiation of linear polarizing light or nano imprinting. Depending on a desired alignment pattern, for example, the patterns of the first and second regions, various methods of forming an alignment layer are known in related art.

The coating layer of the liquid crystal composition may be formed by coating the composition on the alignment layer of the substrate layer by a known method. The composition may be aligned according to an alignment pattern of the alignment layer present under the coating layer and then polymerized, thereby forming the liquid crystal layer.

In still another aspect, a display device is provided. The display device may be a three-dimensional (3D) display device. The display device may include the optical filter described above.

In one embodiment, the display device may further include a display element capable of generating an image signal for a left eye (hereinafter referred to as an "L signal") and an image signal for a right eye (hereinafter referred to as an "R signal"). In this case, an optical filter may be disposed such that one of first and second regions in a polarization control layer may transmit an L signal, and the other may transmit an R signal.

The 3D image display device may be manufactured by various methods known in related art as long as it includes the optical filter as a light dividing element.

FIG. 3 shows an illustrative display device for observing a 3D image when an observer wears glasses.

As shown in FIG. 3, the device 3 may include a light source 301, a first polarizing plate 3021, a display element 303 such as a transmission-type liquid crystal panel, and the optical filter 304.

As the light source 301, a direct- or edge-type backlight generally used in a liquid crystal display (LCD) may be used.

The display element 303 is able to generate L and R signals, and in one embodiment, the display element 303 may be a transmission-type liquid crystal display panel including a plurality of unit pixels arranged in a column and/or row direction(s). One or at least two pixels may be combined to form a region (hereinafter referred to as an "RG region") configured to generate a signal for a right eye, and an image signal generating region (hereinafter referred to as an "LG region") for a left eye generating an L signal.

The RG and LG regions may be closely and alternately arranged in a stripe shape extending in a common direction like the first and second regions of the optical filter.

The optical filter 304 may be disposed such that the R signal generated from the RG region is incident to one of the first and second regions A and B through a second polarizing plate 3022, and the L signal generated from the LG region is incident to the other region through the second polarizing plate 3022.

The display element 303 may be a liquid crystal panel including a first transparent substrate, a pixel electrode, a first alignment layer, a liquid crystal layer, a second alignment layer, a common electrode, a color filter and a second transparent substrate, which are sequentially disposed from the light source 101. The first polarizing plate 3021 may be attached to a side of the panel to which light is incident, that is, a side of the light source 301, and the second polarizing plate 3022 may be attached to the opposite side of the panel. The first and second polarizing plates 3021 and 3022 may be disposed such that absorption axes of both plates have a predetermined angle, for example, 90 degrees. Accordingly, light emitted from the light source 301 may be transmitted through the display element 303, or blocked.

In a driving state, light unpolarized from the light source 301 of the display device 3 may be output to a side of the first polarizing plate 3021. Among light incident to the polarizing plate 3021, light having a polarization axis in a direction parallel to a light transmission axis of the first polarizing plate 3021 may be transmitted through the first polarizing plate 3021 and incident to the display device 303. Light incident to the display element 303 and transmitted through an RG region becomes an R signal, and light transmitted through an LG region becomes an L signal, and then both signals are incident to the second polarizing plate 3022.

Among light incident to the optical filter 304 through the second polarizing plate 3022, light transmitted through the first region and light transmitted through the second region are output in different polarized states. The R and L signals having different polarized states may be incident to the right and left eyes of an observer wearing polarizing glasses, respectively, and thus the observer may see a 3D image.

EFFECTS

In the optical filter, patterns of first and second regions therein may be stably maintained, and therefore the optical filter capable of ensuring excellent light division characteristics for a long time may be provided.

Figure 1:
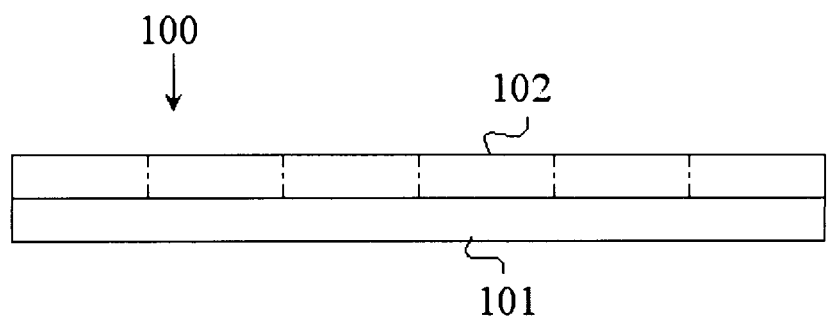
FIG. 1 shows a schematic of one illustrative embodiment of the optical filter.

DESCRIPTION OF THE MARKS 100, 304: optical filters
101: a substrate layer
102: a polarization control layer
A, B: first and second regions
D: a direction according to which the stripe-shaped first and second regions are extended
3: a display device
301: a light source
3021, 3022: polarizing plates
303: a display element
RG, LG: regions configured to generate signals for right and left eyes

DETAILED DESCRIPTION OF EXEMPLARY EMBODIMENTS

Hereinafter, an optical element will be described in detail with reference to Examples according to the present application, and Comparative Example not according to the present application, but the optical element is not limited to the following Examples.

1. Measurement of Elastic Modulus of Substrate Layer

Elastic moduli at 25° C. and 60° C. in first in-plane direction (MD) and second in-plane direction (TD) of the substrate layer were evaluated according to the method for evaluating a tensile modulus suggested below.

A tensile modulus in the first or second in-plane direction may be measured by the stress-strain test method plotted by applied strain regulated in ASTM D638. Specifically, a substrate layer having a length of the first in-plane direction (MD direction) of 16 mm, and a length of the second in-plane direction (TD direction) of 6 mm was cut along a direction to be measured to form a dog bone sample, both ends of the sample were fixed with jigs for a tensile test, and then a tensile modulus was measured according to the ASTM D638. Conditions for measuring a tensile modulus are as follows:

Measuring Equipment: Universal Testing Machine (UTM)
Model: Zwick Roell Z010, Instron
Measuring Conditions:
Load cell: 500 N
Extension Rate: 3 mm/sec 2. Measurement of CTE of Substrate Layer A CTE was evaluated in each of the first and second in-plane directions (MD and TD) of the substrate layer by the following method. The provided substrate layer was stored for approximately 10 days under conditions at a temperature of approximately 25° C. and relative humidity of approximately 50%. After storage, the substrate layer having a length of the first in-plane direction (MD direction) of approximately 16 mm, and a length of the second in-plane direction (TD direction) of approximately 6 mm was placed in measuring equipment, and then taken out after the temperature was increased at a rate of 1° C./min, from 40 to 80° C. Afterward, a length change in each of the first and second in-plane directions was measured, and thereby CTE was measured. The above process was repeated three times to obtain three CTEs in each of the first and second in-plane directions. In addition, the substrate layer having a length of the first in-plane direction (MD direction) of approximately 16 mm, and a length of the second in-plane direction (TD direction) of approximately 6 mm was placed in measuring equipment, and then taken out after the temperature was increased at a rate of 1° C./min, from 80 to 100° C. Afterward, a length change in each of the first and second in-plane directions was measured, and thereby CTE was measured. The above process was repeated three times to obtain three CTEs in each of the first and second in-plane directions. According to the above, finally, a total of 6 CTEs obtained with respect to the first in-plane direction were averaged, thereby obtaining a CTE with respect to the first in-plane direction. In addition, a total of 6 CTEs obtained with respect to the second in-plane direction were averaged, thereby obtaining a CTE with respect to the second in-plane direction.

3. Evaluation of Durability of Liquid Crystal Layer

Durability of a liquid crystal layer was evaluated by measuring a change in phase retardation value generated after a durability test with respect to an optical filter manufactured in Example or Comparative Example. In detail, the optical filter was cut such that each of horizontal and vertical lengths was 10 cm, attached to a glass substrate by means of an adhesive layer, and left under a thermal resistance condition of 80° C. for 100 or 250 hours. A change rate of a phase retardation value (initial Rin) of the liquid crystal layer before the layer was placed under the thermal resistance condition to a phase retardation value (Rin after thermal resistance treatment) after the layer was placed under the thermal resistance condition, was converted into a percentage, and the result is listed in Table 1. Here, the phase retardation value was measured in a wavelength of 550 nm using Axoscan produced by Axomatrix according to a manufacturer's manual. Evaluation criteria are as follows:

<Evaluation Criteria>

O: the case where changes in phase retardation value after storage under a thermal resistance condition for 100 and 250 hours were all less than 8%

Figure 4:
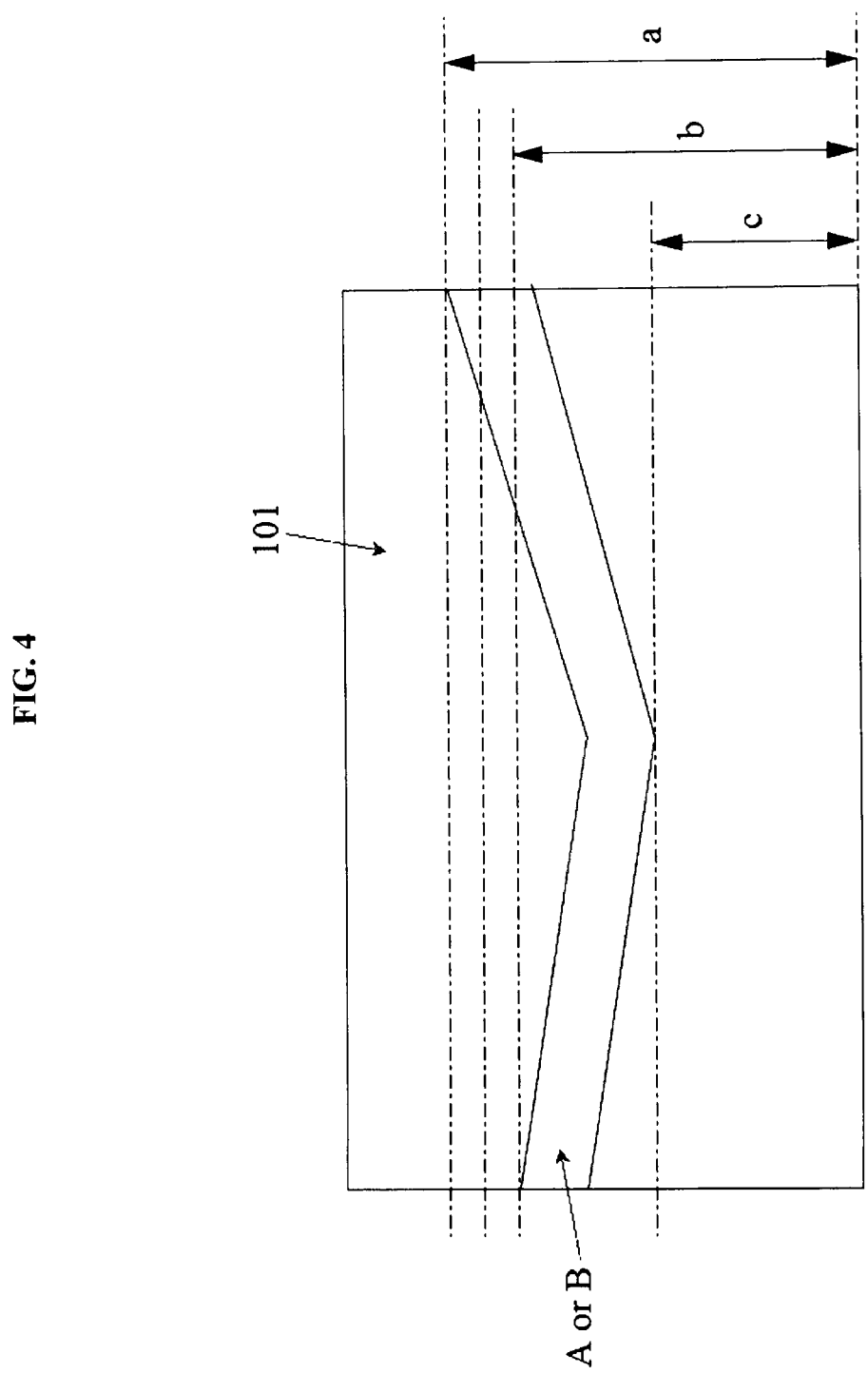
FIG. 4 is to explain how to calculate straightness.

X: the case where any one of changes in phase retardation value after storage under a thermal resistance condition for 100 and 250 hours was 8% or more 4. Evaluation of Dimension Stability Dimension stability was evaluated by measuring straightness in of the stripe-shaped first or second region after maintaining the manufactured optical filter under conditions of a temperature of approximately 25° C. and a relative humidity of approximately 50% for approximately 10 days. The straightness is a deviation of the stripe shape away from right and left sides of the stripe shape from directions in which the first and second regions were extended, and may be calculated using Expression 1 by measuring lengths represented as the "a," "b" and "c" with respect to the stripe-shaped first or second region (A or B) formed on the substrate layer 101 in FIG. 4. The higher the straightness, the further away the stripe shape moved, which means that dimension stability was low. Straightness was measured with respect to 30 identical optical filters, and averages, maximum values, minimum values and standard deviations of the results were calculated.

$$\text{Straightness} = \{(a+b)/2\} - c \qquad \text{[Expression 1]}$$

Example 1

Figure 2:
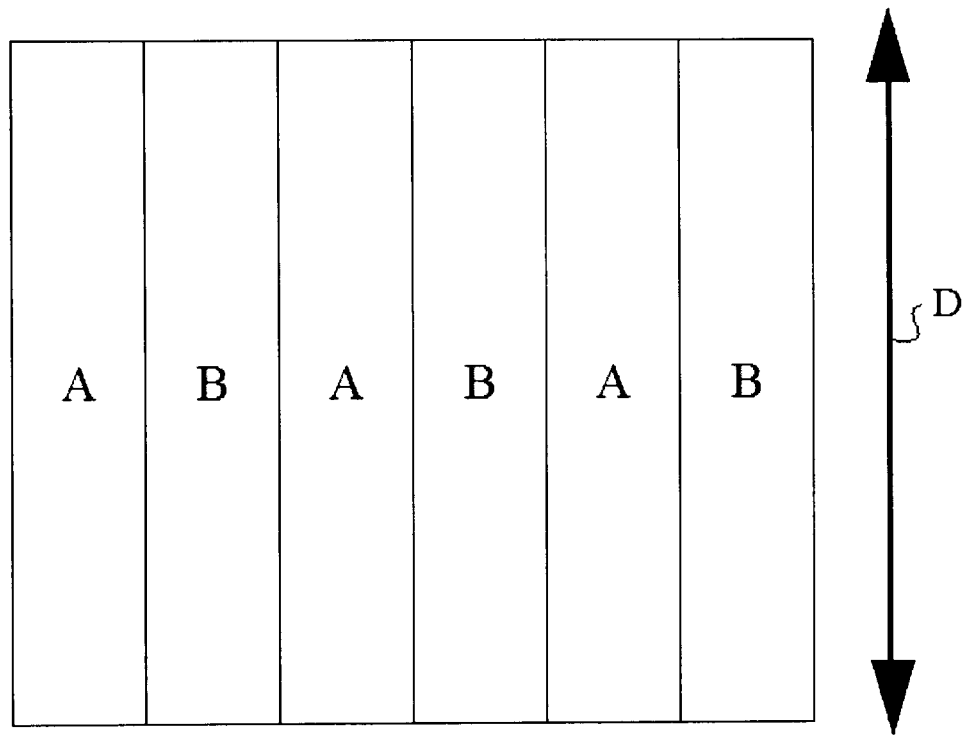
FIG. 2 shows a schematic of one illustrative arrangement of first and second regions.
Figure 3:
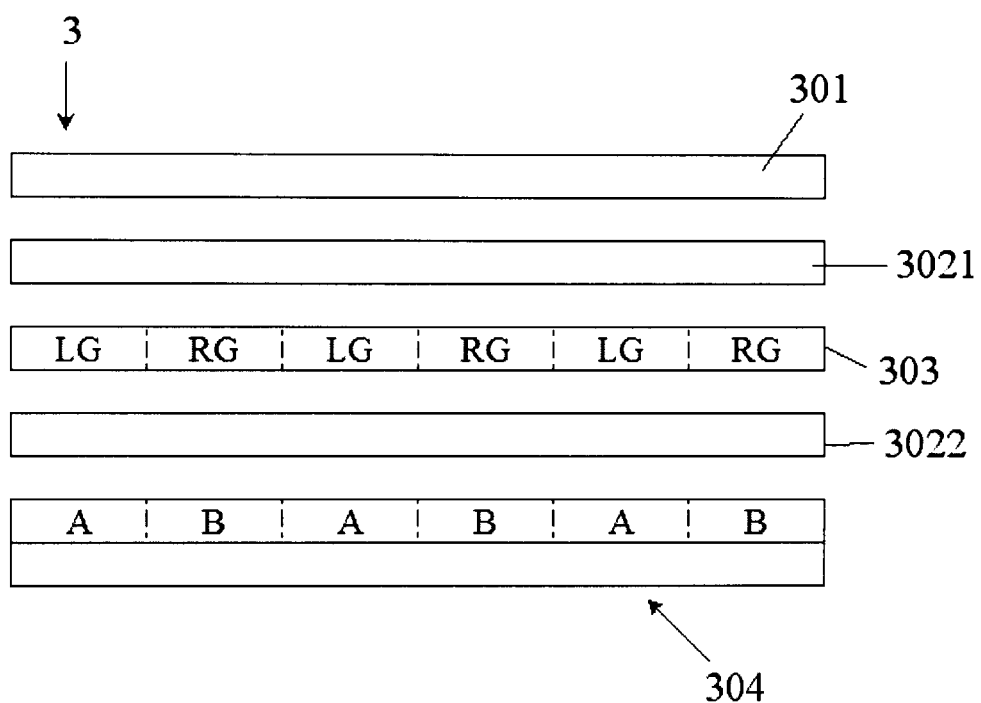
FIG. 3 shows a schematic of one illustrative embodiment of the display device.

An optical filter was manufactured using, as the substrate layer, a triacetyl cellulose (TAC) film having elastic moduli in a horizontal direction (MD) of approximately 2293 MPa at 25° C. and approximately 2165 MPa at 60° C., a CTE in the horizontal direction (MD) of approximately 65 ppm/K, elastic moduli in a vertical direction (TD) of approximately 3061 MPa at 25° C. and approximately 2670 MPa at 60° C., and a CTE in the vertical direction (TD) of approximately 25 ppm/K. A composition for forming a photo-alignment layer was coated on one surface of the substrate layer to have a dry thickness of approximately 1,000 Å, and then dried in an 80° C. oven for 2 minutes. As the composition for forming a photo-alignment layer, a composition prepared by mixing a mixture of polynorbornene (molecular weight ($M_w$)=150,000) having a cinnamate group of Formula 3 and an acryl monomer with a photoinitiator (Irgacure 907), and dissolving the resulting mixture in a toluene solvent to have a solid content of polynorbornene of 2 weight %, was used (polynorbornene:acryl monomer:photoinitiator=2:1:0.25 (weight ratio)). Subsequently, the dried composition for forming a photo-alignment layer was aligned according to the method disclosed in Korean Patent Application No. 2010-0009723 to form a photo-alignment layer including first and second alignment regions, which were aligned in different directions. The first and second alignment regions were formed to have a stripe shape as shown in FIG. 2 and adjacently and alternately disposed, and a direction in which the stripe shape is extended (D in FIG. 2) was parallel to the horizontal direction (MD) of the substrate layer. In detail, a pattern mask in which stripe-shaped light transmission and light blocking parts each having a width of approximately 450 μm were alternately formed in vertical and lateral directions was disposed on the dried composition for a photo-alignment layer, and a polarizing plate having two regions transmitting different polarized light, respectively, was disposed on the pattern mask. Afterward, with transferring the substrate layer having the photo-alignment layer at a rate of approximately 3 m/min, alignment was executed by irradiating a UV ray (300 mW/cm$^2$) to the composition for forming a photo-alignment layer for approximately 30 seconds by means of the polarizing plate and the pattern mask. Subsequently, a liquid crystal layer was formed in the aligned alignment layer. As a liquid crystal composition, a liquid crystal composition including 70 parts by weight of a multifunctional polymerizable liquid crystal compound represented by Formula A, 30 parts by weight of a monofunctional polymerizable liquid crystal compound represented by Formula B, and a suitable amount of a photoinitiator was coated to have a dry thickness of approximately 1 μm, and then aligned according to alignment of the underlying alignment layer. Liquid crystals were crosslinked and polymerized by irradiating a UV ray (300 mW/cm$^2$) for approximately 10 seconds, and thus a liquid crystal layer having first and second regions having optical axes perpendicular to each other according to the alignment of the underlying photo-alignment layer was formed. In the liquid crystal layer, a difference in refractive index between a slow axis direction and a fast axis direction was approximately 0.125.

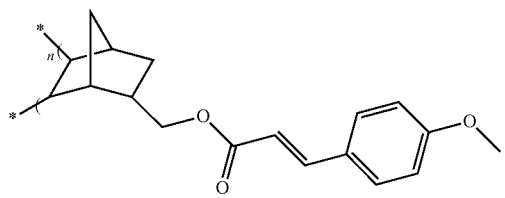

[Formula 3]

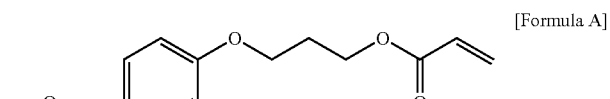

[Formula A]

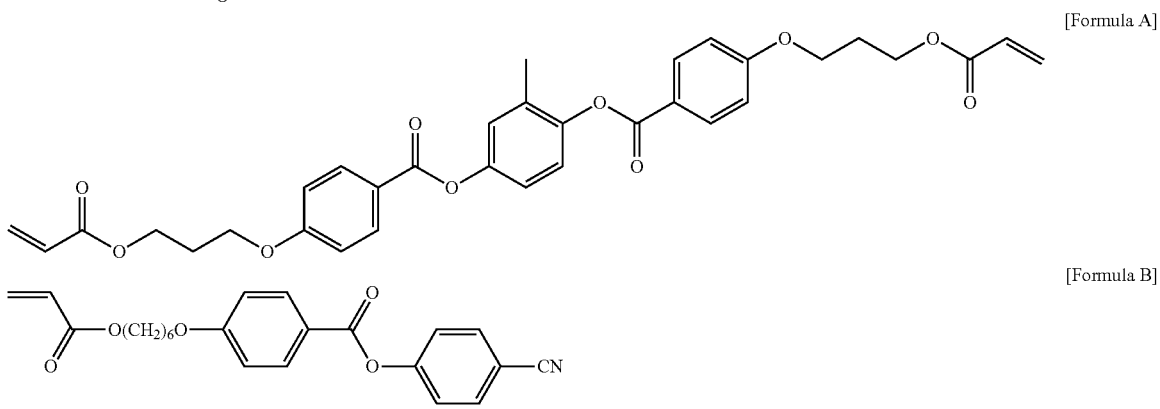

[Formula B]

Example 2

An optical filter was manufactured by the same method as described in Example 1, except that a composition including 55 parts by weight of the liquid crystal compound of Formula A and 45 parts by weight of the liquid crystal compound of Formula B was used as a liquid crystal composition.

Example 3

An optical filter was manufactured by the same method as described in Example 1, except that a TAC film having elastic moduli in a horizontal direction (MD) of approximately 2592 MPa at 25° C. and approximately 2100 MPa at 60° C., a CTE in the horizontal direction (MD) of approximately 53 ppm/K, elastic moduli in a vertical direction (TD) of approximately 2556 MPa at 25° C. and approximately 2124 MPa at 60° C., and a CTE in the vertical direction (TD) of approximately 48 ppm/K, was used as a substrate layer.

Example 4

An optical filter was manufactured by the same method as described in Example 3, except that a composition including 55 parts by weight of the liquid crystal compound of Formula A and 45 parts by weight of the liquid crystal compound of Formula B was used as a liquid crystal composition.

Comparative Example 1

An optical filter was manufactured by the same method as described in Example 1, except that a TAC film having elastic moduli in a horizontal direction (MD) of approximately 2946 MPa at 25° C. and approximately 2506 MPa at 60° C., a CTE in the horizontal direction (MD) of approximately 62 ppm/K, elastic moduli in a vertical direction (TD) of approximately 2219 MPa at 25° C. and approximately 1862 MPa at 60° C., and a CTE in the vertical direction (TD) of approximately 63 ppm/K, was used as a substrate layer.

The physical properties evaluated by the above-described method with respect to the optical filters prepared in Examples and Comparative Example are listed in Table 1.

TABLE 1

| | | Example | | | | Comparative Example |
|---|---|---|---|---|---|---|
| | | 1 | 2 | 3 | 4 | 1 |
| Durability of Liquid Crystal Layer | | ○ | ○ | ○ | ○ | ○ |
| Rin Change Rate | Initial Rin | 125.4 | 120.7 | 125.4 | 120.7 | 125.4 |
| | Rin after Thermal Resistance Treatment | 119.7 | 114.1 | 119.7 | 114.1 | 119.7 |
| | Change Rate (%) | 4.5 | 5.5 | 4.5 | 4.5 | 4.5 |
| Straightness | Average | −0.005 | −0.005 | −0.002 | −0.002 | −0.002 |
| | Maximum Value | 0.009 | 0.009 | 0.020 | 0.020 | 0.074 |
| | Minimum Value | −0.016 | −0.016 | −0.030 | −0.030 | −0.075 |
| | Standard Deviation | 0.008 | 0.008 | 0.012 | 0.012 | 0.039 |

Rin: Phase Retardation Value (unit: nm)
Straightness unit: mm

What is claimed is:
1. An optical filter, comprising:
a substrate layer, of which an elastic modulus in a first in-plane direction is different from an elastic modulus in a second in-plane direction which is perpendicular to the first in-plane direction, the elastic modulus in the first in-plane direction is lower than that in the second in- plane direction, the elastic modulus in the first in-plane direction is in the range from 1,500 MPa to 4,000 MPa at 25° C., and the elastic modulus in the second in-plane direction is in the range from 2,000 MPa to 5,000 MPa at 25° C.; and a polarization control layer that comprises first and second regions configured to divide incident light into two kinds of lights having different polarized states from each other, the first and second regions having stripe shapes extending in a common direction and being disposed adjacently and alternately to each other, the common direction being parallel to one direction among the first and second in-plane directions, in which the elastic modulus is relatively lower.

2. The optical filter according to claim 1, wherein a ratio (MH/ML) of the elastic modulus (MH) in the second in-plane direction at 25° C. with respect to the elastic modulus (ML) in the first in-plane direction at 25° C. is more than 1 and also not more than 3.

3. The optical filter according to claim 1, wherein the elastic modulus in the first in-plane direction is lower than that in the second in-plane direction, and the elastic modulus in the first in-plane direction is in the range from 1,400 MPa to 3,900 MPa at 60° C.

4. The optical filter according to claim 3, wherein the elastic modulus in the second in-plane direction of the substrate layer is in the range from 1,900 MPa to 4,400 MPa at 60° C.

5. The optical filter according to claim 3, wherein a ratio (MH/ML) of the elastic modulus (MH) in the second in-plane direction at 60° C. with respect to the elastic modulus (ML) in the first in-plane direction at 60° C. is more than 1 and also not more than 3.

6. The optical filter according to claim 1, wherein the polarization control layer is a liquid crystal layer satisfying the condition of Expression 1:

$$X < 8\%$$ [Expression 1]

where the "X" is a percentage of the absolute value of a change in value of phase difference after maintaining the optical filter at 80° C. for 100 hours with respect to the initial phase difference of the liquid crystal layer.

7. The optical filter according to claim 1, wherein the polarization control layer is a liquid crystal layer comprising a multifunctional polymerizable liquid crystal compound and a monofunctional polymerizable liquid crystal compound, the monofunctional polymerizable liquid crystal compound being included in an amount of more than 0 parts by weight and also not more than 100 parts by weight, relative to 100 parts by weight of the multifunctional polymerizable liquid crystal compound.

8. The optical filter according to claim 7, wherein the liquid crystal compound is represented by Formula 1:

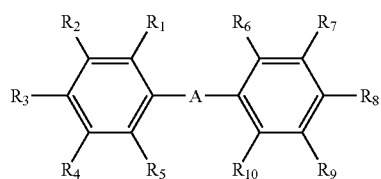

[Formula 1]

where A is a single bond, —COO— or —OCO—, $R_1$ to $R_{10}$ are each independently hydrogen, halogen, an alkyl group, an alkoxy group, an alkoxycarbonyl group, a cyano group, a nitro group, —O-Q-P or a substituent of Formula 2, or an adjacent pair among $R_1$ to $R_5$ or an adjacent pair among $R_6$ to $R_{10}$ are connected with each other so as to from benzene ring substituted with —O-Q-P, with the proviso that at least one of $R_1$ to $R_{10}$ is —O-Q-P or a substituent of Formula 2 or the adjacent pair among $R_1$ to $R_5$ or the adjacent pair among $R_6$ to $R_{10}$ are connected with each other so as to from benzene ring substituted with —O-Q-P; where Q is an alkylene group or an alkylidene group, and P is an alkenyl group, an epoxy group, a cyano group, a carboxyl group, an acryloyl group, a methacryloyl group, an acryloyloxy group, or a methacryloyloxy group,

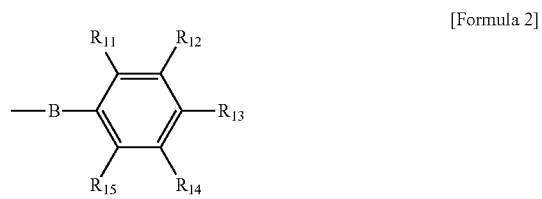

[Formula 2]

where B is a single bond, —COO— or —OCO—, $R_{11}$ to $R_{15}$ are each independently hydrogen, halogen, an alkyl group, an alkoxy group, an alkoxycarbonyl group, a cyano group, a nitro group or —O-Q-P, or an adjacent pair among $R_{11}$ to $R_{15}$ are connected with each other so as to form benzene ring substituted with —O-Q-P, with the proviso that at least one of $R_{11}$ to $R_{15}$ is —O-Q-P or the adjacent pair among $R_{11}$ to $R_{15}$ are connected with each other so as to form benzene ring substituted with —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

9. The optical filter according to claim 7, wherein the polymerizable liquid crystal compound is comprised in the liquid crystal layer in a parallel-aligned state.

10. The optical filter according to claim 1, wherein the polarization control layer is a liquid crystal layer, of which the difference between an in-plane refractive index in a direction of a slow axis and an in-plane refractive index in a direction of a fast axis is in the range from 0.05 to 0.2, and of which the a thickness is in the range from 0.5 µm to 2.0 µm.

11. An optical filter, comprising:
a substrate layer, of which a coefficients of thermal expansion in a first in-plane direction is different from that in a second in-plane direction vertical to the first in-plane direction, and in which the coefficient of thermal expansion in the first in-plane direction is higher than that in the second in-plane direction, the coefficient of thermal expansion in the first in-plane direction is in the range from 35 to 80 ppm/K, and the coefficient of thermal expansion in the second in-plane direction is in the range from 10 to 65 ppm/K; and
a polarization control layer comprising first and second regions configured to divide incident light into two kinds of lights having different polarized states from each other, the first and second regions being formed in a stripe shape extending in a common direction and positioned adjacently and alternately to each other, the common direction being parallel to one direction among the first and second in-plane directions in which the coefficients of thermal expansion is relatively higher.

12. The optical filter according to claim 11, wherein the ratio (CH/CL) of the coefficient (CH) of thermal expansion in the first in-plane direction with respect to the coefficient (CL) of thermal expansion in the second in-plane direction is more than 1 and also not more than 5.

13. An optical filter, comprising:

a substrate layer, of which an elastic modulus and a coefficient of thermal expansion in a first in-plane direction are different respectively from those in a second in-plane direction vertical to the first in-plane direction, and in which the elastic modulus in the first in-plane direction is lower than that in the second in-plane direction, the elastic modulus in the first in-plane direction is in the range from 1,500 MPa to 4,000 MPa at 25° C., the elastic modulus in the second in-plane direction is in the range from 2,000 MPa to 5,000 MPa at 25° C., the coefficient of thermal expansion in the first in-plane direction is higher than that in the second in-plane direction, the coefficient of thermal expansion in the first in-plane direction is in the range from 35 to 80 ppm/K, and the coefficient of thermal expansion in the second in-plane direction is in the range from 10 to 65 ppm/K; and a polarization control layer comprising first and second regions configured to divide incident light into two kinds of lights having different polarized states, the first and second regions being formed in a stripe shape extending in a common direction and positioned adjacently and alternately to each other, and the common direction being parallel to the first in-plane direction.

14. A display device, comprising the optical filter of claim 1.

15. The display device according to claim 14, further comprising a display element configured to generate image signals for left and right eyes, and the optical filter being positioned on the display element such that the image for a left eye is incident on one region among the first and second regions of the polarization control layer, and the image for a right eye is incident on the other region among the first and second regions of the polarization control layer.

* * * * *